(12) United States Patent
Shirai

(10) Patent No.: US 6,580,495 B2
(45) Date of Patent: Jun. 17, 2003

(54) SURVEYING INSTRUMENT HAVING A PHASE-DIFFERENCE DETECTION TYPE FOCUS DETECTING DEVICE AND A BEAM-SPLITTING OPTICAL SYSTEM

(75) Inventor: Masami Shirai, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/852,020

(22) Filed: May 10, 2001

(65) Prior Publication Data

US 2001/0050763 A1 Dec. 13, 2001

(30) Foreign Application Priority Data

May 12, 2000 (JP) ........................................ 2000-139850

(51) Int. Cl.[7] ................................................. G01C 3/08
(52) U.S. Cl. ........................ 356/5.1; 356/4.01; 356/5.01
(58) Field of Search ................................ 356/4.01–5.15

(56) References Cited

U.S. PATENT DOCUMENTS

| 3,464,770 | A | * | 9/1969 | Schmidt | ........................ 356/4 |
| 4,686,360 | A | * | 8/1987 | Gorgon | ...................... 250/201 |
| 4,916,324 | A | * | 4/1990 | Meier | ........................ 250/561 |
| 5,288,987 | A | * | 2/1994 | Vry et al. | ................. 250/201.3 |
| 5,886,340 | A | | 3/1999 | Suzuki et al. | |
| 5,886,777 | A | | 3/1999 | Hirunuma | |
| 5,923,468 | A | | 7/1999 | Tsuda et al. | |
| 5,949,548 | A | | 9/1999 | Shirai et al. | |
| 6,072,642 | A | | 6/2000 | Shirai | |
| 6,108,435 | A | * | 8/2000 | Mori et al. | .................. 382/106 |
| 6,194,694 | B1 | | 2/2001 | Shirai | |
| 6,226,076 | B1 | * | 5/2001 | Yoshida | ..................... 356/5.06 |
| 6,252,655 | B1 | * | 6/2001 | Tanaka | ....................... 356/5.06 |
| 6,324,024 | B1 | * | 11/2001 | Shirai et al. | ................. 359/884 |

\* cited by examiner

Primary Examiner—Thomas H. Tarcza
Assistant Examiner—Brian K Andrea
(74) Attorney, Agent, or Firm—Greenblum & Bernstein, P.L.C.

(57) ABSTRACT

A surveying instrument includes a sighting for sighting an object; a beam-splitting optical system positioned between an objective lens and an eyepiece, and having a wavelength selection mirror which reflects light with specific wavelengths while allowing light having wavelengths other than the specific wavelengths to pass therethrough; an optical distance meter which includes a light-transmitting optical system for transmitting measuring light toward the object, and a light-receiving optical system for receiving light reflected by the object; and a phase-difference detection type focus detecting device which detects a focus state from a correlation between a pair of images respectively formed by two light bundles which are passed through two different pupil areas on the objective lens and the wavelength selection mirror. The two different pupil areas are positioned so that the two light bundles are incident on the wavelength selection mirror at the same incident angle.

14 Claims, 7 Drawing Sheets

SURVEYING INSTRUMENT HAVING A PHASE-DIFFERENCE DETECTION TYPE FOCUS DETECTING DEVICE AND A BEAM-SPLITTING OPTICAL SYSTEM

BACKGROUND OF THE INVENTION

1. Field of the Invention

The present invention relates to a surveying instrument, and more specifically relates to a surveying instrument having a phase-difference detection type focus detecting device which employs a beam-splitting optical system as an element of an optical distance meter of the surveying instrument.

2. Description of the Related Art

A conventional surveying instrument such as a total station has a function to measure the distance between two points and also horizontal and vertical angles. Such a conventional surveying instrument generally measures the distance between two points with an electronic distance meter (EDM) incorporated in or attached to the surveying instrument. The electronic distance meter incorporates an optical distance meter which calculates the distance via the phase difference between projecting light and reflected light and via the initial phase of internal reference light, or via the time difference between the projecting light and the reflected light. The optical distance meter includes a light-transmitting optical system for transmitting a measuring light (projecting light) to the target (sighting object) via the objective lens of a sighting telescope (collimating telescope) provided as a component of the electronic distance meter, and a light-receiving optical system for receiving light (reflected light) reflected by the target.

Among conventional surveying instruments having such an electronic distance meter, a surveying instrument whose electronic distance meter employs a prism having a dichroic mirror (wavelength selection mirror) that serves as a beam-splitting optical system is known in the art. Such a prism having a dichroic mirror is hereinafter referred to as a "dichroic prism". The dichroic mirror reflects light with specific wavelengths while allowing light with other wavelengths to pass through. The dichroic prism is disposed between the objective lens and the eyepiece of the sighting telescope so that the measuring light, which is emitted by a light emitting element, is reflected by the dichroic mirror of the dichroic prism to be projected toward the target (sighting object) via the objective lens of the sighting telescope. The light which is reflected by the target and passed through the objective lens is selectively reflected by the dichroic mirror to travel to a light-receiving element.

On the other hand, advancements have been made in the development of surveying instruments provided with a sighting telescope having an autofocus system, wherein phase-difference detection type autofocus system is widely used in the autofocus therefor. With this system, an in-focus state is detected based on the correlation between two images formed by two light bundles which are respectively passed through two different pupil areas upon passing through different portions of an objective lens of the sighting telescope to bring the sighting telescope into focus in accordance with the detected in-focus state.

SUMMARY OF THE INVENTION

An object of the present invention is to provide a surveying instrument having a phase-difference detection type focus detecting device which employs a beam-splitting optical system as an element of the optical distance meter of the surveying instrument, wherein both the optical distance meter and the phase-difference detection type focus detecting device can operate with a high precision.

To achieve the object mentioned above, according to an aspect of the present invention, a surveying instrument is provided, including a sighting telescope having an objective lens and an eyepiece for sighting an object; a beam-splitting optical system positioned between the objective lens and the eyepiece, and having a wavelength selection mirror which reflects light with specific wavelengths while allowing light having wavelengths other than the specific wavelengths to pass through the wavelength selection mirror, the wavelength selection mirror being inclined with respect to a plane perpendicular to an axis of the sighting telescope; an optical distance meter which includes a light-transmitting optical system for transmitting a measuring light toward the object via the wavelength selection mirror, and a light-receiving optical system for receiving light reflected by the object via the wavelength selection mirror; and a phase-difference detection type focus detecting device which detects a focus state from a correlation between a pair of images respectively formed by two light bundles which are passed through two different pupil areas on the objective lens and the wavelength selection mirror. The two different pupil areas are positioned so that the two light bundles which are respectively passed through the two different pupil areas are incident on the wavelength selection mirror at the same incident angle.

Preferably, the wavelength selection mirror includes a dichroic mirror.

In an embodiment, the surveying instrument according further includes a Porro-prism erecting system positioned between the beam-splitting optical system and the eyepiece.

In an embodiment, the phase-difference detection type focus detecting device includes an AF sensor unit positioned adjacent to the Porro-prism erecting system so that the AF sensor unit receives light reflected by the Porro-prism erecting system.

In an embodiment, the sighting telescope includes a focus adjustment lens positioned between the beam-splitting optical system and the Porro-prism erecting system.

In an embodiment, the optical distance meter includes a light-emitting element which emits the measuring light; and a light-receiving element which receives the measuring light reflected by the object and received by the light-receiving optical system.

According to another aspect of the present invention, a surveying instrument is provided, including a sighting telescope having an objective lens and an eyepiece for sighting an object; a beam-splitting optical system positioned between the objective lens and the eyepiece, and having a wavelength selection mirror which reflects light with specific wavelengths while allowing light having wavelengths other than the specific wavelengths to pass through the wavelength selection mirror, the wavelength selection mirror being inclined to a plane perpendicular to an axis of the sighting telescope; an optical distance meter which includes a light-transmitting optical system for transmitting a measuring light toward the object via the wavelength selection mirror, and a light-receiving optical system for receiving light reflected by the object via the wavelength selection mirror; and a phase-difference detection type focus detecting device which detects a focus state from a correlation between a pair of images respectively formed by two light bundles which are respectively passed through two different pupil areas of the objective lens and the wavelength selection mirror. The two different pupil areas are positioned so that a plane which passes respective centers of the two different pupil areas extends substantially perpendicular to a plane which includes an axis of light incident upon the wavelength selection mirror and an axis of light reflected by the wavelength selection mirror.

Preferably, the wavelength selection mirror includes a dichroic mirror.

In an embodiment, the surveying instrument further includes a Porro-prism erecting system positioned between the beam-splitting optical system and the eyepiece.

In an embodiment, the phase-difference detection type focus detecting device includes an AF sensor unit positioned adjacent to the Porro-prism erecting system so that the AF sensor unit receives light reflected by the Porro-prism erecting system.

In an embodiment, the sighting telescope includes a focus adjustment lens positioned between the beam-splitting optical system and the Porro-prism erecting system.

In an embodiment, the optical distance meter includes a light-emitting element which emits the measuring light; and a light-receiving element which receives the measuring light reflected by the object and received by the light-receiving optical system.

The present disclosure relates to subject matter contained in Japanese Patent Application No. 2000-139850 (filed on May 12, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
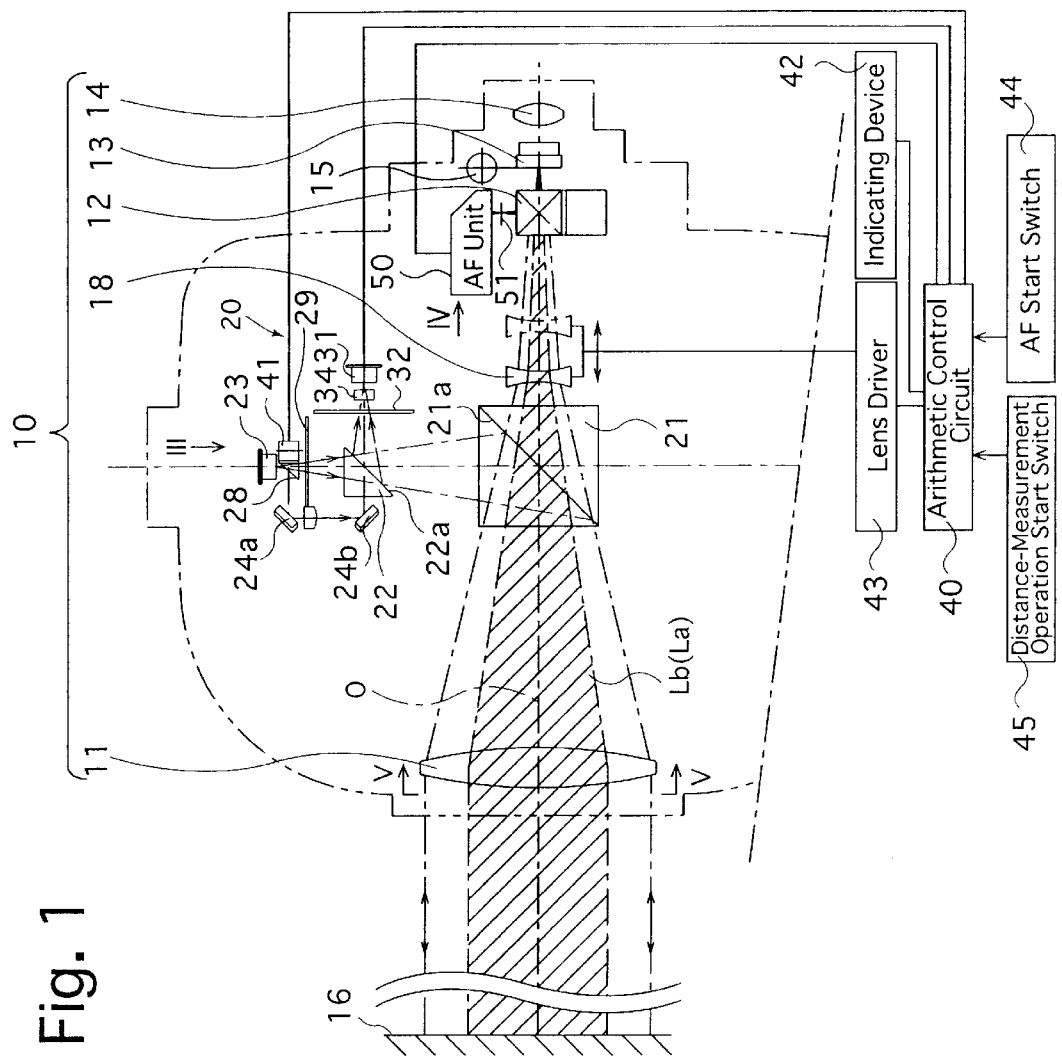
FIG. 1 is a schematic diagram of an embodiment of an autofocus electronic distance meter having a phase-difference detection type focus detecting device and a beam-splitting optical system, according to the present invention.

FIG. 1 shows an embodiment of an electronic distance meter (EDM) equipped with an autofocus system, according to the present invention. This electronic distance meter can be incorporated in or attached to a surveying instrument such as a total station. The electronic distance meter is provided with a cubic dichroic prism 21 that serves as a beam-splitting optical system. The dichroic prism 21 is constructed from two right-angle prisms which are adhered to each other. The dichroic prism 21 is provided with a dichroic mirror 21a (wavelength selection mirror) which is formed on a boundary surface between the two right-angle prisms. For example, the boundary surface is coated with a special metal material to form the dichroic mirror 21a. The electronic distance meter is provided with a sighting telescope (sighting telescope optical system) 10 and an optical distance meter 20. As shown in FIG. 1, the sighting telescope 10 is provided with an objective lens 11, a focusing lens 18, a Porro-prism erecting system (erecting optical system) 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in the direction of an optical axis O of the sighting telescope 10. The image of an object (sighting object) 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided between the objective lens 11 and the focusing lens 18 with the aforementioned dichroic prism 21. The dichroic prism 21 is an element of the optical distance meter 20, and is fixedly positioned behind the objective lens 11 via a fixing device (not shown). The dichroic prism 21 is provided therein with the aforementioned dichroic mirror 21a which reflects light with specific wavelengths while allowing others to pass therethrough. The dichroic prism 21 is positioned on the optical axis O so that the dichroic mirror 21a is inclined to a plane perpendicular to the optical axis O by a certain angle (45 degrees in this particular embodiment).

The optical distance meter 20 is provided above the dichroic prism 21 with a light-emitting element (laser diode) 23, which is an element of the optical distance meter 20. The light-emitting element 23 emits light (measuring light) having a specific wavelength within the range of wavelengths of the light which is reflected by the dichroic mirror 21a of the dichroic prism 21. The measuring light (externally-projecting light) emitted from the light-emitting element 23 is reflected by the dichroic mirror 21a to be projected toward the sighting object 16 via the objective lens 11. The light-emitting element 23 and the dichroic mirror 21a are elements of a light-transmitting optical system of the optical distance meter 20. The measuring light which is reflected by the sighting object 16 and passed through the objective lens 11 is reflected by the dichroic mirror 21a again. At this time, the wavelengths of the light bundles incident upon the dichroic mirror 21a, which are not within the range of wavelengths of the light which is reflected by the dichroic mirror 21a, pass through the dichroic mirror 21a.

Figure 3:
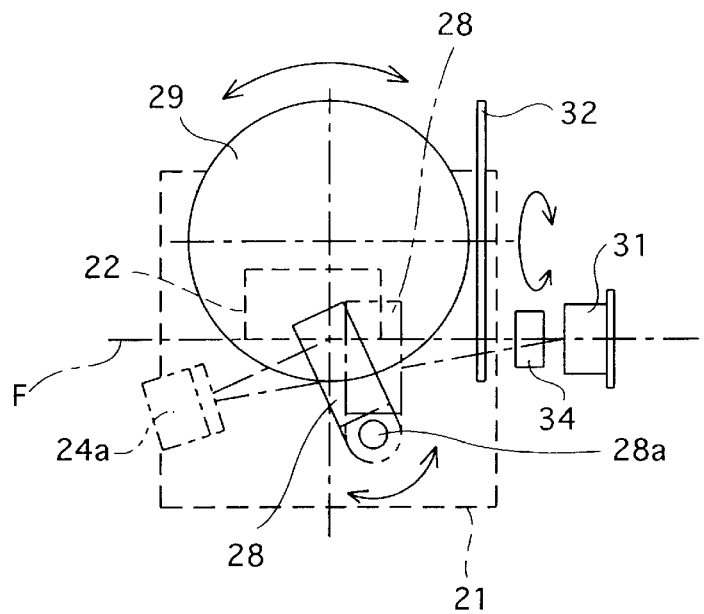
FIG. 3 is a plan view of a switching-mirror drive mechanism provided in the autofocus electronic distance meter shown in FIG. 1, viewed in the direction of an arrow III in FIG. 1.

A right-angle prism 22 which is an element of the optical distance meter 20 is disposed between the light-emitting element 23 and the dichroic prism 21. The right-angle prism 22 is positioned on one side (the upper side as viewed in FIG. 3) of a plane F (see FIG. 3) which includes the optical axis of a light-receiving element 31 and the optical axis of the light-emitting element 23 so that the measuring light which is reflected by the dichroic mirror 21a and incident on a reflection surface 22a of the right-angle prism 22 is reflected by the reflection surface 22a to be incident on the light-receiving element 31. The dichroic mirror 21a, the reflection surface 22a and the light-receiving element 31 are elements of a light-receiving optical system of the optical distance meter 20.

The electronic distance meter is provided between the right-angle prism 22 and the light-emitting element 23, on a distance-measuring optical path, with a switching prism 28 and a first ND filter 29. The switching prism 28 can rotate about a pivot 28a between an advanced position (the position shown by a chain line in FIG. 3) and a retracted position (the position shown by a solid line in FIG. 3). The measuring light emitted by the light-emitting element 23 is incident on a first fixed mirror 24a to be reflected thereby to be incident as an internal reference light on the light-receiving element 31 via a second fixed mirror 24b when the switching prism 28 is positioned in the advanced position, and the measuring light emitted by the light-emitting element 23 is incident directly on the dichroic mirror 21a of the dichroic prism 21 when the switching prism 28 is positioned in the retracted position. The first ND filter 29 is used to adjust the amount of light of the measuring light incident on the sighting object 16.

The electronic distance meter is provided between the right-angle prism 22 and the light-receiving element 31 with a second ND filter 32 and a band-pass filter 34, in that order from the right-angle prism 22 to the light-receiving element 31. The light-receiving element 31 is connected to an arithmetic control circuit (controller) 40. The arithmetic control circuit 40 is connected to an actuator 41 which drives the switching prism 28, and an indicating device (e.g., an LCD panel) 42 which indicates the calculated distance.

As is known in the art, the optical distance meter 20 establishes two different states: one state wherein the light (measuring light) emitted by the light-emitting element 23 is supplied to the dichroic prism 21, and another state wherein the light (internal reference light) is supplied to the fixed mirror 24a, which are determined in accordance with the switching state of the switching prism 28 driven by the arithmetic control circuit 40 via the actuator 41. As described above, the measuring light supplied to the dichroic prism 21 is projected toward the sighting object 16 via the dichroic mirror 21a and the objective lens 11, and the measuring light reflected by the sighting object 16 is incident on the light-receiving element 31 via the objective lens 11, the dichroic mirror 21a, the reflection surface 22a, the second ND filter 32 and the band-pass filter 34. The arithmetic control circuit 40 detects the phase difference between the projecting light and the reflected light and the initial phase of the internal reference light which is supplied to the light-receiving element 31 via the switching prism 28, the first fixed mirror 24a and the second fixed mirror 24b, or the time difference between the projecting light and the reflected light, to calculate the distance from the electronic distance meter to the sighting object 16. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 4:
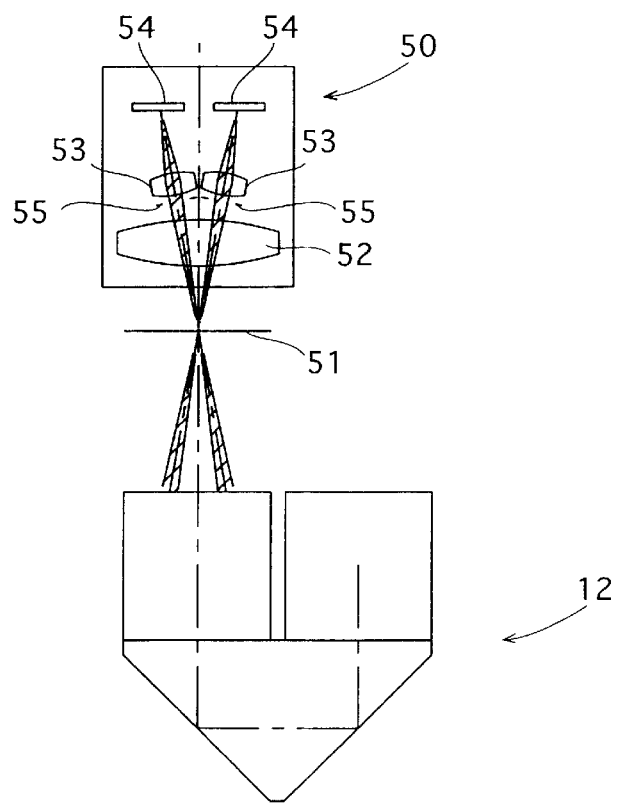
FIG. 4 is a conceptual diagram of the phase-difference detection type focus detecting device (AF sensor unit) and a Porro-prism erecting system, as viewed in the direction of an arrow IV shown in FIG. 1.

The Porro-prism erecting system 12 is provided with a beam splitting surface which splits the incident light bundle into two light bundles, so that one of the two light bundles proceeds toward a phase-difference detection type AF sensor unit (phase-difference detection type focus detecting device) 50 while the other light bundle proceeds toward the eyepiece 14. A reference focal plane 51 is provided between the Porro-prism erecting system 12 and the AF sensor unit 50 and is located at a position optically equivalent to the position at which the reticle 15 of the focal-plane plate 13 is placed. The AF sensor unit 50 detects the focus state (amount of defocus and direction of focal shift) on the reference focal plane 51. FIG. 4 shows a conceptual diagram of the AF sensor unit 50 and the Porro-prism erecting system 12. The AF sensor unit 50 includes a condenser lens 52, a pair of separator lenses 53, and a pair of line sensors (e.g., multi segment CCD sensors) 54 located behind the respective separator lenses 53. The pair of separator lenses 53 is arranged apart from each other by the base length. The image of the sighting object 16 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the objective lens 11 to bring the sighting object 16 into focus via a lens driver 43 (see FIG. 1) in accordance with the calculated amount of defocus. The defocus operation is well-known in the art. An AF start switch 44 and a distance-measurement operation start switch 45 are connected to the arithmetic control circuit 40.

The AF sensor unit 50 detects an in-focus state from the pair of images respectively formed on the pair of line sensors 54 by two light bundles which are respectively passed through two different pupil areas 11A and 11B (see FIG. 5) on the objective lens 11. The shape of each of the two pupil areas 11A and 11B can be determined by the shape of the aperture formed on corresponding one of a pair of separator masks 55 which are respectively positioned in the vicinity of the pair of separator lenses 53 between the condenser lens 52 and the pair of separator lenses 53.

Figure 5:
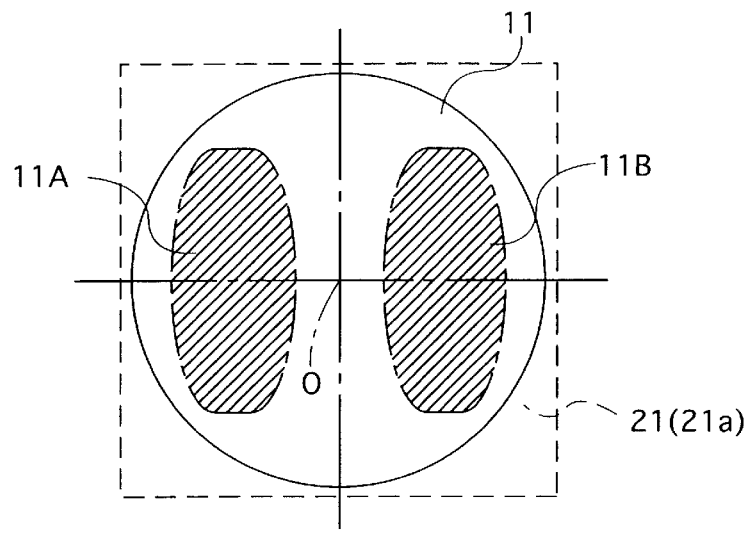
FIG. 5 is a front elevational view of an objective lens of a sighting telescope of the autofocus electronic distance meter, showing the positional relationship between two pupil areas on the objective lens and a dichroic prism shown by a broken line, viewed in the direction of arrows V in FIG. 1.

FIG. 5 shows the positional relationship between the two pupil areas 11A and 11B, and the positional relationship between the dichroic prism 21 (dichroic mirror 21a) and the two pupil areas 11A and 11B. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the directions of the two pupil areas 11A and 11B (the directions of the two pupil areas 11A and 11B relative to the center of the objective lens 11) can be determined comparatively freely.

Figure 2:
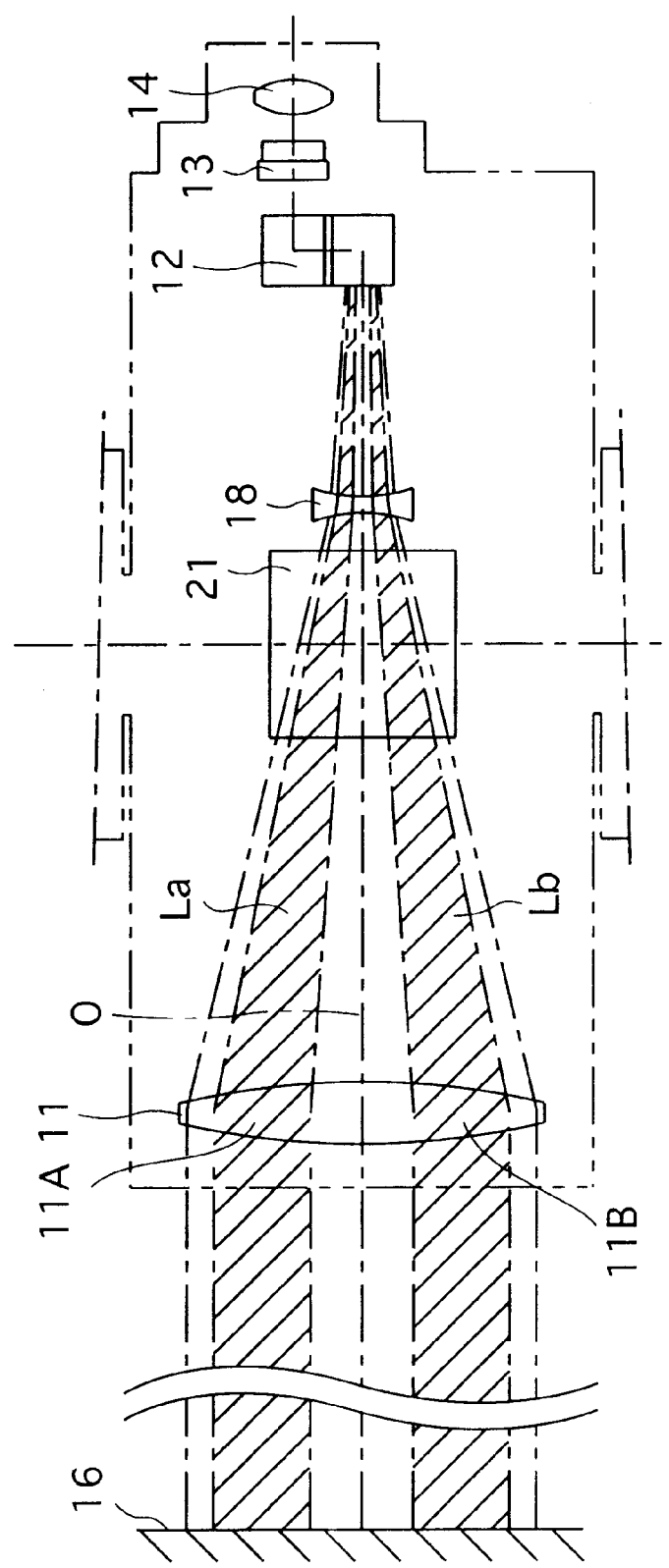
FIG. 2 is a plan view of fundamental optical elements of the autofocus electronic distance meter shown in FIG. 1.

In the above illustrated embodiment of the electronic distance meter, the two pupil areas 11A and 11B are orientated so that two light bundles La and Lb which are respectively passed through the two different pupil areas 11A and 11B on the objective lens 11 are incident on the dichroic mirror 21a at the same incident angle as shown in FIGS. 1 and 2. In other words, the two pupil areas 11A and 11B are positioned so that a plane which passes each center of the pupil areas 11A and 11B extends substantially perpendicular to a plane which includes an axis of the light incident upon the dichroic mirror 21a and an axis of the light reflected by the dichroic mirror 21a. Although the transmittance of the dichroic mirror 21a varies in accordance with the angle of the incident light upon the dichroic mirror 21a, the two light bundles La and Lb pass through the dichroic mirror 21a with the same transmittance since the two light bundles La and Lb are incident on the dichroic mirror 21a at the same incident angle. Accordingly, the pair of line sensors 54 respectively receive the transmitted light bundles of the two light bundles La and Lb which have the same amount of light, which makes it possible to perform the autofocus operation with high precision.

In addition, the Porro-prism erecting system 12 has the aforementioned beam splitting surface that is inclined to a plane perpendicular to the optical axis O of the sighting telescope, and the two light bundles which are respectively passed through the two different pupil areas 11A and 11B on the objective lens 11 and passed through the dichroic mirror 21a and the focusing lens 18, are incident on the inclined beam splitting surface. In the present embodiment of the electronic distance meter, since the Porro-prism erecting system 12 is positioned so that these two light bundles, which are respectively passed through the two different pupil areas 11A and 11B on the objective lens 11 and passed through the dichroic mirror 21a and the focusing lens 18, are incident on the inclined beam splitting surface at the same incident angle too, a variation in the quantity of light between the two light bundles due to the difference between the incident angles of the two light bundles incident on the inclined beam splitting surface does not occur when the autofocus operation is performed. Accordingly, the autofocus operation is not hindered by any variation in the quantity of the two light bundles.

The electronic distance meter equipped with an autofocus system which has the above described structure performs a distance measuring operation in a manner such as described in the following description.

In the first step, a surveyor (user) aims the sighting telescope 10 at the sighting object 16 so that the optical axis O of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the aforementioned distance-calculating operation, wherein the calculated distance is indicated on the indicating device 42.

Figure 6:
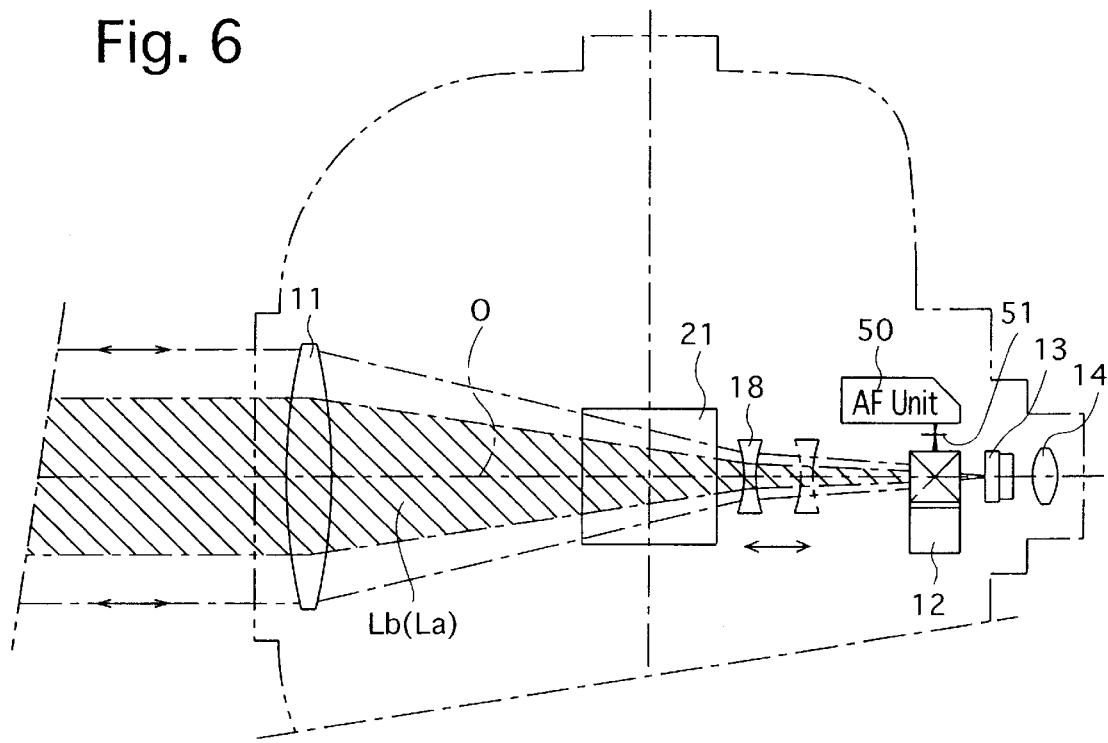
FIG. 6 is a view similar to that of FIG. 1 and illustrates a comparative example of the autofocus electronic distance meter, wherein two light bundles which are respectively passed through the two pupil areas on the objective lens and incident on the wavelength selection surface of the dichroic prism at different incident angles.
Figure 7:
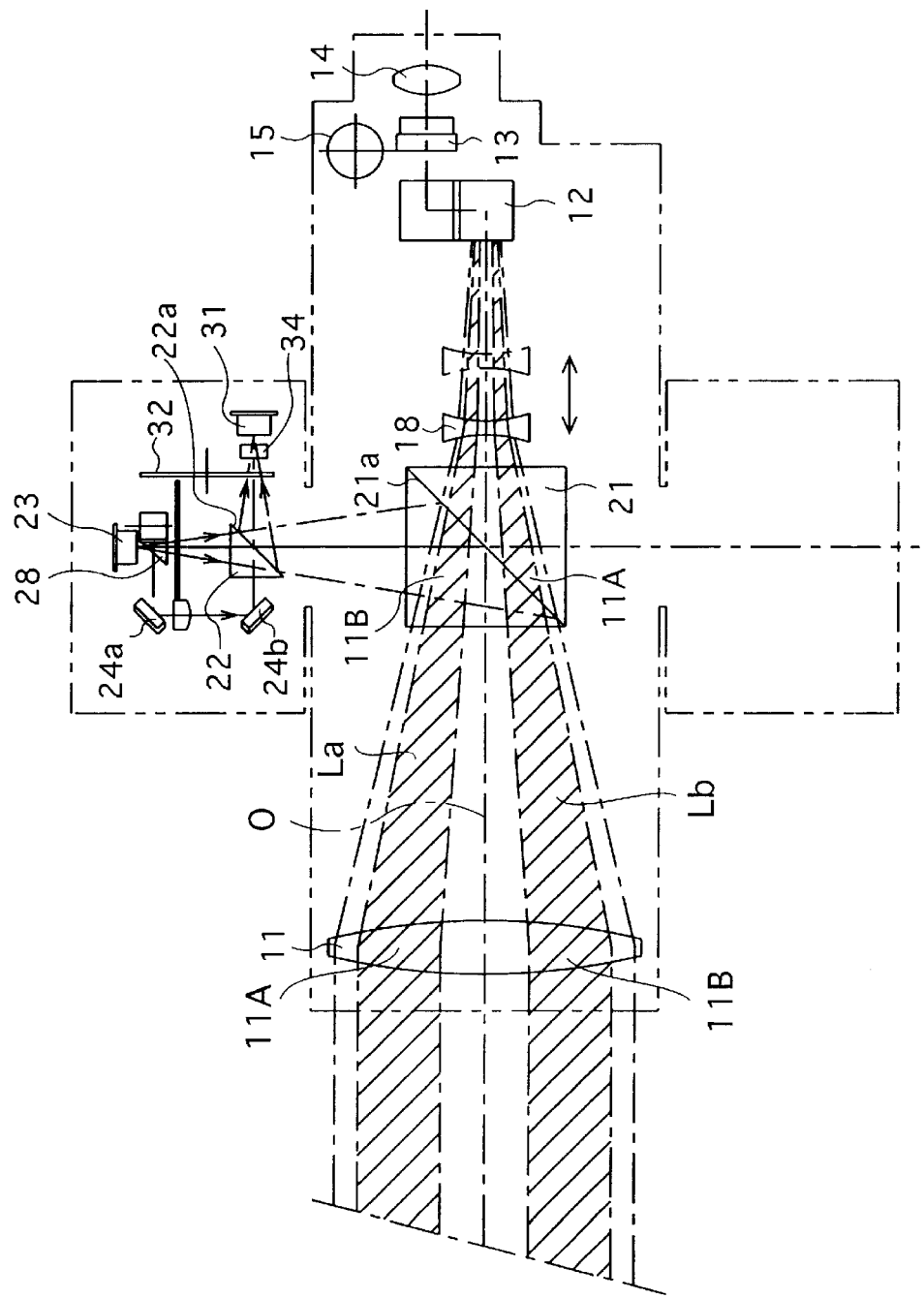
FIG. 7 is view similar to that of FIG. 2 and illustrates the comparative example shown in FIG. 6.
Figure 8:
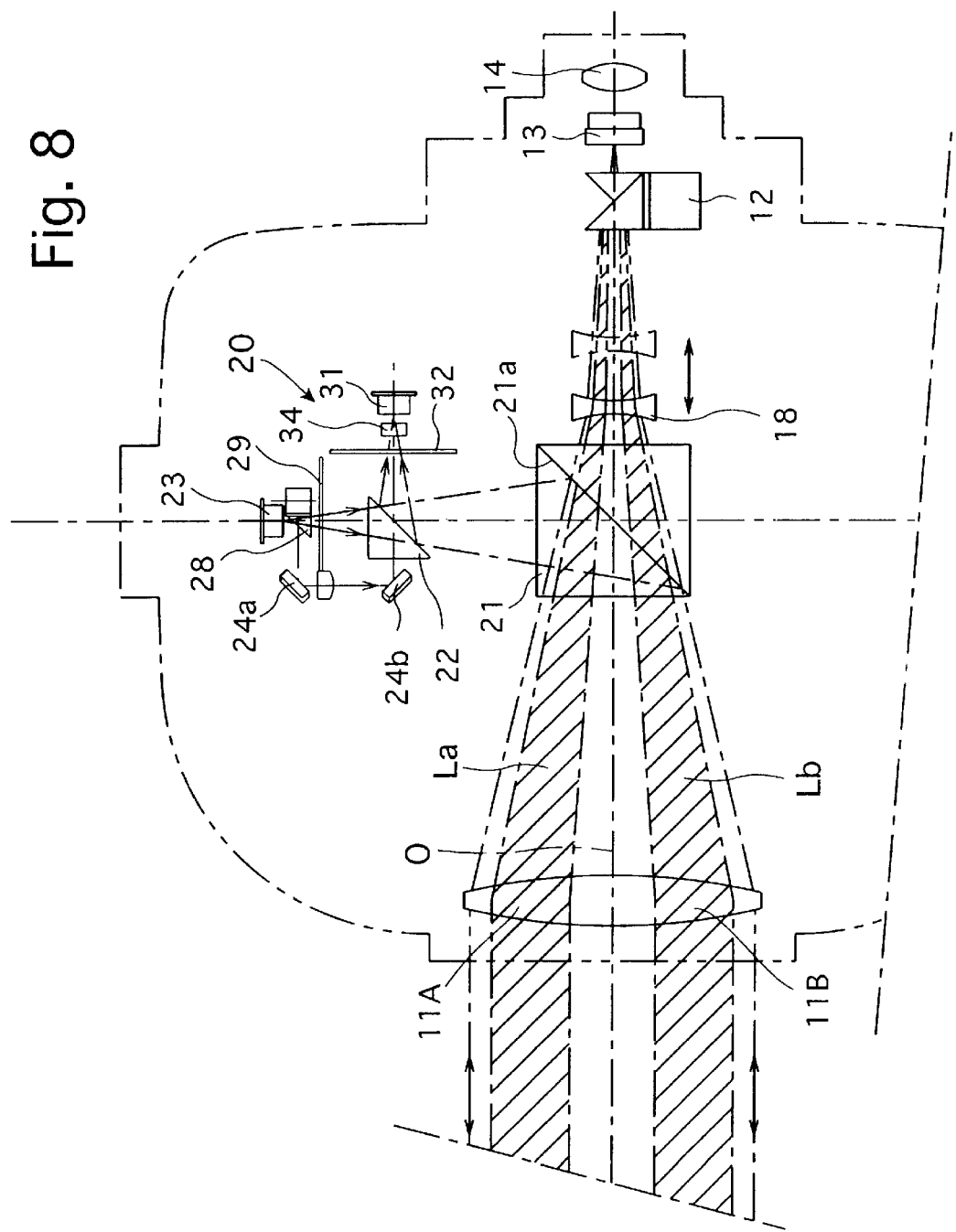
FIG. 8 is a view similar to that of FIG. 1 and illustrates another comparative example of the autofocus electronic distance meter, where two light bundles which are respectively passed through the two pupil areas on the objective lens and incident on the wavelength selection surface of the dichroic prism at different incident angles.
Figure 9:
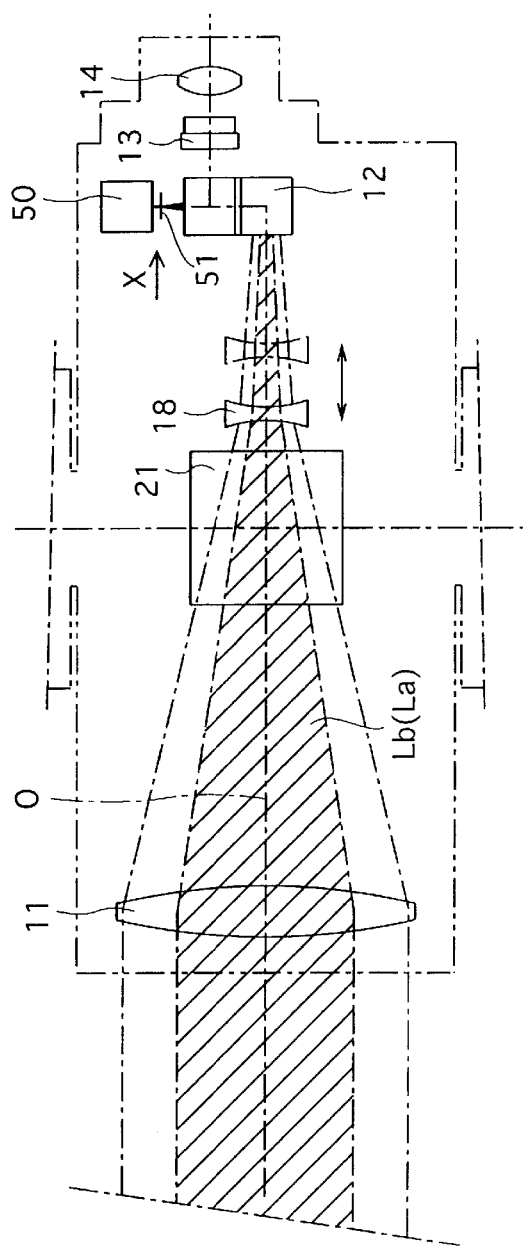
FIG. 9 is view similar to that of FIG. 2 and illustrates the comparative example shown in FIG. 8.
Figure 10:
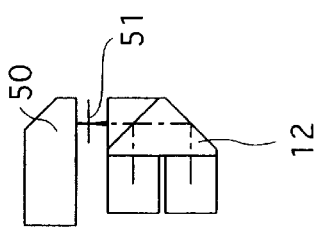
FIG. 10 is a front elevational view of an AF sensor unit and a Porro-prism erecting system which are shown in FIGS. 8 and 9, viewed in the direction of an arrow X in FIG. 9.

FIGS. 6 and 7 show an comparative example of the electronic distance meter, which is to be compared with the above illustrated embodiment of the electronic distance meter, while FIGS. 8, 9 and 10 show another comparative example of the electronic distance meter, which is to be compared with the above illustrated embodiment of the electronic distance meter. In each of these (undesirable) comparative examples, the two light bundles La and Lb which are respectively passed through the two different pupil areas 11A and 11B on the objective lens 11 are incident on the dichroic mirror 21a at different incident angles. In the example shown in FIGS. 6 and 7, the dichroic prism 21 of FIGS. 1 and 2 is rotated about the optical axis O of the sighting telescope 10 by 90 degrees. In the other example shown in FIGS. 8, 9 and 10, the arrangement of the Porro-prism erecting system 12 and the AF sensor unit 50 is different from that shown in FIGS. 1 and 2. In each of these two examples, it can be seen from FIGS. 7 and 8 that the two light bundles La and Lb which are respectively passed through the two different pupil areas 11A and 11B on the objective lens 11 are incident on the dichroic mirror 21a at different incident angles. This causes the pair of line sensors 54 to receive the two light bundles of different light amounts, respectively, which has an adverse effect on the autofocus operation.

In the above illustrated embodiment of the electronic distance meter, although the dichroic prism 21 having the dichroic mirror 21a is used as a beam-splitting optical system, the dichroic prism 21 can be replaced by a plane-parallel plate having a dichroic mirror formed on a surface of the plane-parallel plate. In this case, the autofocus operation is performed with a high precision by orientating the two pupil areas 11A and 11B so that two light bundles La and Lb which are respectively passed through the two different pupil areas 11A and 11B on the objective lens 11 are incident on the dichroic mirror of the plane-parallel plate at the same incident angle.

As can be understood from the foregoing, according to an embodiment of the surveying instrument having a phase-difference detection type focus detecting device and a beam-splitting optical system, to which the present invention is applied, both the optical distance meter and the phase-difference detection type focus detecting device can operate with high precision even if a phase-difference detection type focus detecting device is incorporated in a surveying instrument in which a beam-splitting optical system is used as an element of an optical distance meter.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A surveying instrument comprising:
   a sighting telescope having an objective lens and an eyepiece for sighting an object;
   a beam-splitting optical system positioned between said objective lens and said eyepiece, and having a wavelength selection mirror which reflects light with specific wavelengths while allowing light having wavelengths other than said specific wavelengths to pass through said wavelength selection mirror, said wavelength selection mirror being inclined with respect to a plane perpendicular to an axis of said sighting telescope;

an optical distance meter which includes a light-transmitting optical system for transmitting a measuring light toward said object via said wavelength selection mirror, and a light-receiving optical system for receiving light reflected by said object via said wavelength selection mirror; and a phase-difference detection type focus detecting device which detects a focus state from a correlation between a pair of images respectively formed by two light bundles which are passed through two different pupil areas on said objective lens and said wavelength selection mirror;

wherein said two different pupil areas are positioned so that said two light bundles which are respectively passed through said two different pupil areas are incident on said wavelength selection mirror at the same incident angle.

2. The surveying instrument according to claim 1, wherein said wavelength selection mirror comprises a dichroic mirror.

3. The surveying instrument according to claim 1, further comprising a Porro-prism erecting system positioned between said beam-splitting optical system and said eyepiece.

4. The surveying instrument according to claim 3, wherein said phase-difference detection type focus detecting device comprises an AF sensor unit positioned adjacent to said Porro-prism erecting system so that said AF sensor unit receives light reflected by said Porro-prism erecting system.

5. The surveying instrument according to claim 3, wherein said sighting telescope comprises a focus adjustment lens positioned between said beam-splitting optical system and said Porro-prism erecting system.

6. The surveying instrument according to claim 1, wherein said optical distance meter comprises:

a light-emitting element which emits said measuring light; and a light-receiving element which receives said measuring light reflected by said object and received by said light-receiving optical system.

7. A surveying instrument comprising:

a sighting telescope having an objective lens and an eyepiece for sighting an object;

a beam-splitting optical system positioned between said objective lens and said eyepiece, and having a wavelength selection mirror which reflects light with specific wavelengths while allowing light having wavelengths other than said specific wavelengths to pass through said wavelength selection mirror, said wavelength selection mirror being inclined to a plane perpendicular to an axis of said sighting telescope;

an optical distance meter which includes a light-transmitting optical system for transmitting a measuring light toward said object via said wavelength selection mirror, and a light-receiving optical system for receiving light reflected by said object via said wavelength selection mirror; and a phase-difference detection type focus detecting device which detects a focus state from a correlation between a pair of images respectively formed by two light bundles which are respectively passed through two different pupil areas of said objective lens and said wavelength selection mirror;

wherein the light bundles respectively passed through said two different pupil areas extend in a plane substantially perpendicular to a plane which includes an axis of light incident upon said wavelength selection mirror and an axis of light reflected by said wavelength selection mirror.

8. The surveying instrument according to claim 7, wherein said wavelength selection mirror comprises a dichroic mirror.

9. The surveying instrument according to claim 7, further comprising a Porro-prism erecting system positioned between said beam-splitting optical system and said eyepiece.

10. The surveying instrument according to claim 9, wherein said phase-difference detection type focus detecting device comprises an AF sensor unit positioned adjacent to said Porro-prism erecting system so that said AF sensor unit receives light reflected by said Porro-prism erecting system.

11. The surveying instrument according to claim 9, wherein said sighting telescope comprises a focus adjustment lens positioned between said beam-splitting optical system and said Porro-prism erecting system.

12. The surveying instrument according to claim 7, wherein said optical distance meter comprises:

a light-emitting element which emits said measuring light; and a light-receiving element which receives said measuring light reflected by said object and received by said light-receiving optical system.

13. A surveying instrument comprising:

a sighting telescope having an objective lens and an eyepiece for sighting an object, said objective lens configured to pass a first type of light and a second type of light therethrough;

a beam-splitting optical system positioned between said objective lens and said eyepiece, and having a wavelength selection mirror which reflects light with specific wavelengths while allowing light having wavelengths other than said specific wavelengths to pass through said wavelength selection mirror, said wavelength selection mirror being inclined with respect to a plane perpendicular to an axis of said sighting telescope;

an optical distance meter which includes a light-transmitting optical system for transmitting a measuring light toward said object via said wavelength selection mirror, and a light-receiving optical system for receiving light reflected by said object via said wavelength selection mirror; and a pair of pupil areas on said objective lens, each said pupil area of said pair of pupil areas configured to pass a light bundle of the first type of light through said objective lens;

a phase-difference detection-type focus detecting device which detects a focus state from a correlation between a pair of images respectively formed by said pair of light bundles, wherein the first type of light is configured to form an image on said focus detecting device, via a said pupil area and said wavelength selection mirror, and the second type of light is not configured to form an image on said focus detecting device;

wherein said pair of pupil areas are positioned on said objective lens so that each said light bundle of the first type of light is incident on said wavelength selection mirror at the same incident angle.

14. A surveying instrument comprising:

a sighting telescope having an objective lens and an eyepiece for sighting an object;

a beam-splitting optical system positioned between said objective lens and said eyepiece, and having a wavelength selection mirror which reflects light with specific wavelengths while allowing light having wavelengths other than said specific wavelengths to pass through said wavelength selection mirror, said wavelength selection mirror being inclined with respect to a plane perpendicular to an axis of said sighting telescope;

an optical distance meter which includes a light-transmitting optical system for transmitting a measuring light toward said object via said wavelength selection mirror, and a light-receiving optical system for receiving light reflected by said object via said wavelength selection mirror, and a phase-difference detection type focus detecting device which detects a focus state from a correlation between a pair of images respectively formed by two light bundles which are passed through two different pupil areas on said objective lens and said wavelength selection mirror;

wherein said focus detecting device and said wavelength selection mirror are positioned so that said two light bundles which are respectively passed through said two different pupil areas, are incident on said wavelength selection mirror at the same incident angle.

* * * * *